UNITED STATES PATENT OFFICE.

THOMAS H. BERRY, OF LYNN, MASSACHUSETTS.

IMPROVEMENT IN MODE OF PREPARING COFFEE FOR TRANSPORTATION.

Specification forming part of Letters Patent No. 63,987, dated April 23, 1867.

*To all whom it may concern:*

Be it known that I, THOMAS H. BERRY, of Lynn, in the county of Essex and State of Massachusetts, have invented a new and useful Method of Preparing Coffee for Transportation and the market; and I do hereby declare that the following is a full and exact description thereof.

The nature of my invention consists in combining, with ground coffee, certain glutinous substance or substances in such a manner that each particle shall be rendered impervious to air, and also to make the coffee capable of being compressed into a mass that shall receive and retain any desirable shape.

To enable others skilled in similar processes to prepare coffee by this method, I will proceed to describe the composition and manner of working.

I first make a solution of one ounce of French isinglass and four ounces of pure water. The coffee to be acted upon is first ground, then placed in a flat dish, and the solution first described sprinkled carefully over the mass, the whole being constantly stirred until each separate particle of coffee is covered.

I have found by experiment that the best proportion is one ounce of French isinglass, four fluidounces of water, and one pound of ground coffee.

The mass, mixed as above described, before being allowed to become too dry, is put into molds of any desired size and form, and pressed into cakes. This completes the operation.

The advantages that I claim for my new process of preparing coffee are these: Each particle of coffee being covered or varnished with the glutinous material above described, it retains its full flavor and strength. Also, coffee compounded in this manner admits of being pressed into cakes, thus rendering it very convenient to pack and to transport. The fact that this article is much more compact than coffee is usually packed and sold, together with the fact that it will retain its strength for a long time, renders this article very valuable for travelers.

The spirit of my invention consists in mixing with coffee some innoxious ingredient that shall cover each grain, making it proof against the action of the atmosphere, and thus render the whole, as a mass, capable of being compressed into a cake.

Having thus described my invention, I will now proceed to set forth my claim.

What I claim as my invention, and desire to secure by Letters Patent of the United States, is—

The above-described composition of matter, substantially as and for the purpose set forth.

THOS. H. BERRY.

Witnesses:
 A. HUN BERRY,
 F. G. PARKER.